H. J. SEGUR.
SPOTLIGHT CONTROL.
APPLICATION FILED MAR. 31, 1921.
1,415,409.
Patented May 9, 1922.
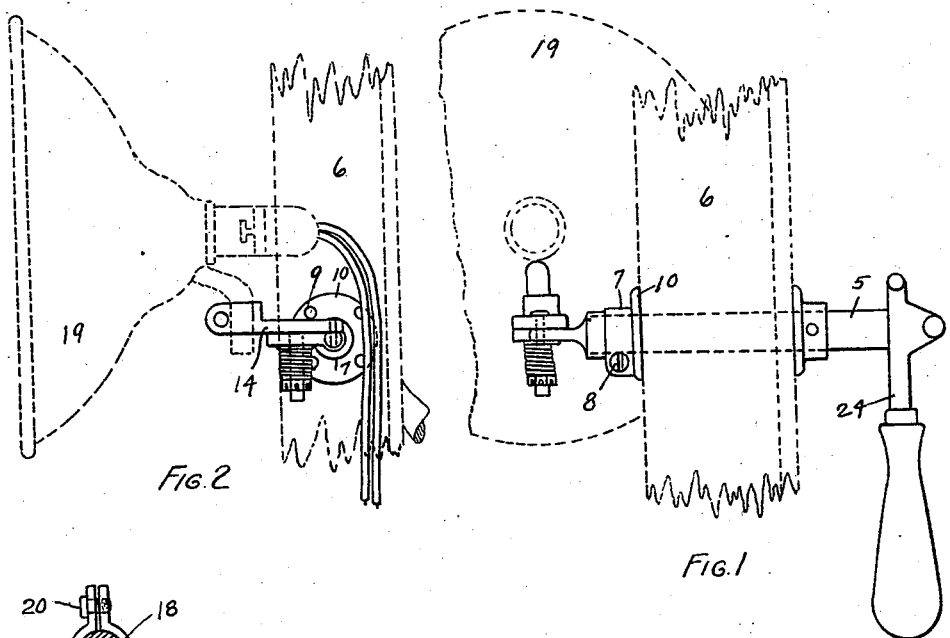
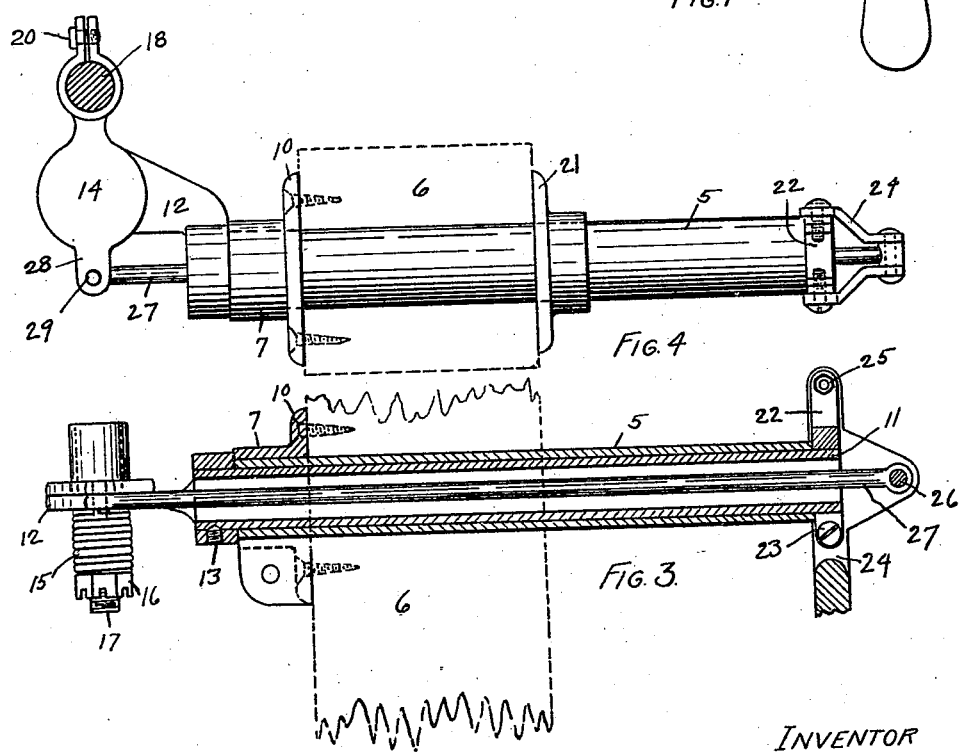
INVENTOR
HOWARD J. SEGUR
By E. B. Birkenbeul
ATTORNEY.

UNITED STATES PATENT OFFICE.

HOWARD J. SEGUR, OF PORTLAND, OREGON.

SPOTLIGHT CONTROL.

1,415,409.     Specification of Letters Patent.     Patented May 9, 1922.

Continuation of joint application Serial No. 402,727, filed August 10, 1920. This application filed March 31, 1921. Serial No. 457,293.

*To all whom it may concern:*

Be it hereby known that I, HOWARD J. SEGUR, a citizen of the United States, and resident of Portland, in the county of Multnomah and State of Oregon, have invented a new and useful Spotlight Control, of which the following is a specification.

This invention relates more particularly to a means for controlling the spot light of enclosed automobiles.

The object of my invention is to enable one to direct the rays from a spot light from within the enclosure of an automobile without reaching through the windows or curtains.

I attain this result in the manner set forth in the following specification and illustrated in the accompanying drawing, in which:—

Figure 1 is a rear elevation of the device taken from the driver's seat. Figure 2 is a side elevation. Both of these views show the relation of the device to the upright of a closed car and the spot light itself, which are shown in dotted lines. Figure 3 is a vertical section through the device of which Figure 4 is a plan.

Similar numbers of reference refer to the same or similar parts throughout the several views.

Referring in detail to the drawing, I have constructed my device of a tube member 5 for which a hole is made in the upright 6 of an automobile. On one end of this tube 5 I have placed a split flange 7 provided with a screw 8 by means of which it can be securely clamped to the tube 5. Screws 9 pass through the flange 10 and into the upright 6.

Rotatably mounted within the tube 5 is a hollow shaft 11 projecting from the tube 5 at each end. On its upper end I have secured a bracket 12 by means of the set screw 13. A rotatable lamp bracket 14 is frictionally held upon the bracket 12 by means of the spring 15 whose tension may be varied by the nut 16 on the bolt 17 which forms a pivot for the bracket 14. The shank 18 of the spot light 19 is secured by means of the screw 20. If desired a second flanged collar 21 may be placed on the tube 5 on the inner side of the upright 6.

On the inner end of the hollow shaft 11 I have secured a forked arm 22 which is clamped to the shaft 11 by means of the screw 23. Hinged to the upper end of the forked arm 22 is a forked hand lever 24 whose hinge is formed by the bolts 25. Also attached between the forks of the lever 24 by means of a connecting pin 26 is a connecting rod 27 which passes through the length of the shaft 11 and connects with the arm 28 on the lamp bracket 14 by means of the pin 29.

It will be evident that any lateral movement applied to the hand lever 24 will result in a lateral movement being produced at the lamp bracket 14, and that any rotating movement of the lever 24 about the axis of the shaft 11 raises or lowers the vertical angle of the bracket 14.

While I have thus illustrated and described my invention it is not my desire to limit myself to this precise form or method of application, but intend that it shall cover all forms and modifications that fall fairly within the appended claims.

What I claim is:

A spot light control consisting of a horizontal tube member adapted to pass through an upright member of an automobile, a collar on either side of said upright one of which is secured to the tube by means of a set screw and the other by means of friction, said friction held collar also being attached to the upright member by means of screws, a central tube member projecting from each end of said first mentioned tube, a collar member secured to one of said projecting ends, a lever hinged to said collar, a rod attached to said lever and passing through said central tube, an arm attached to the opposite end of said central tube, a wrist plate attached to said arm and connected to said rod member, a means for producing friction between said wrist plate and said arm, and a means for attaching said spot light to said wrist plate.

HOWARD J. SEGUR.